United States Patent

Gitlin et al.

[11] Patent Number: 6,064,662
[45] Date of Patent: *May 16, 2000

[54] SYSTEM AND METHOD FOR OPTIMIZING SPECTRAL EFFICIENCY USING TIME-FREQUENCY-CODE SLICING

[75] Inventors: Richard D. Gitlin, Little Silver; Zygmunt Haas, Holmdel; Mark J. Karol, Fair Haven; Clark Woodworth, Rumson, all of N.J.

[73] Assignee: AT&T Corp, New York, N.Y.

[*] Notice: This patent is subject to a terminal disclaimer.

[21] Appl. No.: 09/154,403

[22] Filed: Sep. 14, 1998

Related U.S. Application Data

[63] Continuation of application No. 08/234,197, Apr. 28, 1994, abandoned.

[51] Int. Cl.[7] .................................................. H04J 4/00
[52] U.S. Cl. ...................... 370/330; 370/335; 370/342; 370/436; 370/441
[58] Field of Search ..................................... 370/330, 329, 370/436, 437, 478, 468, 479, 335, 336, 337, 342, 343, 345, 431, 441, 442, 465, 480, 498, 535, 477; 375/200, 201, 202, 203, 204, 205, 206

[56] References Cited

U.S. PATENT DOCUMENTS

| | | | |
|---|---|---|---|
| 4,868,811 | 9/1989 | Suzuki . | |
| 4,914,649 | 4/1990 | Schwendeman et al. . | |
| 5,029,180 | 7/1991 | Cowart | 375/206 |
| 5,134,615 | 7/1992 | Freeburg | 370/330 |
| 5,210,771 | 5/1993 | Schaeffer et al. | 375/203 |
| 5,260,967 | 11/1993 | Schilling | 375/203 |
| 5,295,153 | 3/1994 | Gudmundson | 375/205 |
| 5,317,593 | 5/1994 | Fulghum | 370/342 |
| 5,533,013 | 7/1996 | Lappanen | 370/342 |
| 5,539,730 | 7/1996 | Dent | 370/330 |
| 5,577,024 | 11/1996 | Malkamaki et al. | 370/337 |
| 5,581,548 | 12/1996 | Ugland | 370/337 |

*Primary Examiner*—Huy D. Vu

[57] ABSTRACT

A system and method for optimizing usage of a communications transmission medium. The transmission medium may be sliced into time and frequency domains so as to create time-frequency slices for assignment to users having varying access rates and user-application requirements. Through scheduling of the various speed users within the frequency and time domains, the system and method can efficiently allocate and make use of the available spectrum, thereby accommodating higher rate users requiring greater bandwidths and time slot assignments while still preserving cost-efficient access for lower speed users. Depending on the signal modulation scheme, the time-frequency slices may be allocated on non-contiguous frequency bands. The system and method is also applicable to code-division multiple access (CDMA) techniques by slicing the available code space along time-code domains, frequency-code domains or, in three dimensions, along time-frequency-code domains. Users may be efficiently scheduled based on code space requirements so as to optimize user of the communication medium.

14 Claims, 6 Drawing Sheets

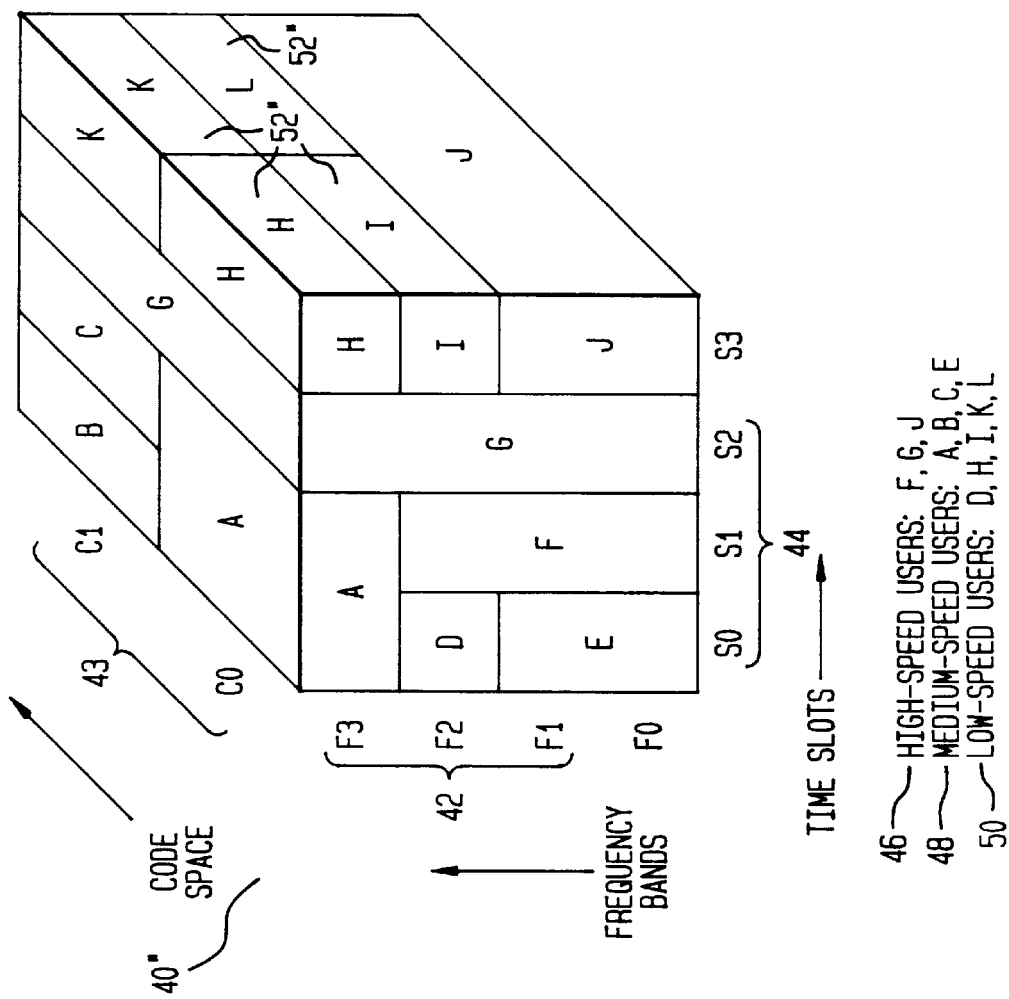

SYSTEM AND METHOD FOR OPTIMIZING SPECTRAL EFFICIENCY USING TIME-FREQUENCY-CODE SLICING

This is a continuation application, pursuant to 37 CFR § 1.53(b), of copending Application Ser. No. 08/234,197 filed Apr. 28, 1994 abandoned.

1. TECHNICAL FIELD

The invention relates to a system and method for maximizing usage of a communications transmission medium, and more particularly, to a system and method for maximizing usage of a communications transmission medium while preserving optimum access to the medium for users of differing access speeds and while maximizing spectral use and bandwidth efficiencies.

2. PROBLEM

Many communication systems today, such as the wireless, satellite, personal communications, and cellular communications systems, typically exhibit certain common requirements. For example, to maximize their flexibility, these communications systems typically require a variety of access speeds in order to support differing applications. In order to be economically viable, the systems should also offer a generally low-cost access for lower-speed users. Lastly, the systems typically strive for a high degree of spectral efficiency in order to maximize usage of the particular communications transmission medium.

As is known, certain data transmission architectures have been developed in communications systems to allocate communication resources to individual users on their demand. Typically, these architectures ought to be structured to permit various users to utilize the resources in a fully shared communications system. Thus, the various architectures are generically referred to as "multiple access" architectures.

Referring to FIG. 1, one multiple access architecture for maximizing usage of the communications transmission medium is commonly referred to as time-division multiple access (TDMA). As known to those skilled in the art, in TDMA each carrier frequency 1 is severed into one or more time frames 2 having a plurality of individual time slots 4. Each of the time slots 4 is assigned to a user as an independent circuit. Information is transmitted by the user in short bursts during assigned or specified time slots, with users being scheduled for access to the time slots 4 according to their information transmission requirements. As will be appreciated, however, in pure TDMA architecture both higher-speed and lower-speed users share a common communications bandwidth, typically by assigning more time slots per frame to the higher-speed users. The drawback of this architecture is that high-rate access (high speed data bursts) is required even for lower-speed users, which increases the cost and complexity of the systems employed by those lower-speed users.

A second multiple access approach for structuring a communications transmission medium, as known to those skilled in the art, is referred to as frequency-division multiple access (FDMA). A depiction of the FDMA approach is illustrated in FIG. 2. Unlike TDMA, the FDMA approach is independent of time. In FDMA, a number of individualized, narrowband channels 12 are used across the frequency domain (spectrum) 10. Rather than being partitioned into individualized time slots across the channel, in FDMA, one circuit 14 is assigned per channel 12 and, typically, users can access any one of the frequencies 12 in the frequency spectrum 10. A drawback of a pure FDMA architecture is that the maximum bandwidth available to an individual user is oftentimes limited, even if the particular user desires a large peak bandwidth for only a short period of time. In order to access greater bandwidth, the user often has to utilize a plurality of transmitters that allows him to access several frequencies at the same time. This may add to the cost of the systems employed by those users. Moreover, as only a single user can occupy any given frequency, regardless of the time that the user will occupy a frequency(ies) 12, the frequency spectrum 10 may not be fully utilized.

Attempts have been made to support users having differing communication requirements in various of the aforementioned communications systems. For instance, to support users of arbitrary access speeds and to retain low-cost access for low-speed users, a "Universal Time Slot" approach has been proposed by R. A. Thompson, J. J. HorenKamp, and G. D. Berglund (*Phototonic Switching of Universal Time-Slots*, XIII International Switching Symposium Proceedings, Session C2 Paper 4, Stockholm, May 1990). A depiction of the Universal Time Slot approach is found in FIG. 3. In the Universal Time Slot approach, each transmission frame 22 in real time 20 is separated into a plurality of individual time slots 24 of a set duration (for instance, X nanoseconds). The individual time slots 24 can transmit a given number of bits for voice (n bits) or video (m bits) transmissions, using different amounts of medium bandwidth. A so-called "data transparency" is created in each of the time slots, in that the signals in each time slot are typically generated and received asynchronously.

Another attempt to maximize use of communication systems has been proposed by Zygmunt Haas and Richard D. Gitlin using a "Field Coding" technique (*Optical Distribution Channel: An Almost-All Optical LAN Based On The Field Coding Technique*, Journal of High-Speed Networks 1 (1992), pp. 193–214). Field coding, typically used for optical transmissions, addresses the costly handicap of requiring an optical switching node to operate at the peak data transmission rate. Field coding separates the switching rate from the transmission rate by employing differing bit rates for the header (26) and data fields (27) of the optical packets (see FIG. 4). Guard bands 28 are used to separate individual user transmissions. Because the switching node performs only the switching operation and does not need to process the data portion of the packet, the switching node can operate at the lower header rate, allowing the faster rate data field to pass transparently through the switching node.

In both of the proposed approaches, users are allowed to transmit at their own desired rate during their assigned time slots. However, while suitable for optical media where bandwidth is abundant, these techniques are in fact spectrally inefficient. In the cases of the previously mentioned communication systems (for instance, radio), the available communications transmission medium is quite limited and is often costly; there is typically only a limited amount of bandwidth available for access by users of the various communications systems. Thus, techniques that make efficient use of the transmission spectrum are necessary.

3. SOLUTION

These and other problems are addressed by a system and method for maximizing complete usage of the communications transmission medium according to the invention. The system and method recognize that the transmission medium can be partitioned in frequency, time and code domains, and through optimum scheduling, user packing within the overall frequency-time-code domain can be maximized in order to optimize spectral efficiency. The system and method also preserve a degree of inexpensive access for users with lower access speed requirements.

In one embodiment of the system and method according to the invention, the transmission resource, partitioned into the "time-frequency" domain, is divided into a plurality of time-frequency "slices" that are allocated to users according to their various transmission requirements. For higher speed users, frequency slots are usually assigned contiguously in order to optimize the design of modulation and transmission architectures (e.g. a single transmitter for higher rate users). In a variant of this embodiment, where frequency adjacency requirements can be eased, higher speed users can be assigned two or more non-contiguous time-frequency slices to further maximize spectral efficiency.

In a further application of the system and method according to the invention, the time-frequency slicing approach can also be applied to data transmissions with code division multiple access (CDMA) to account for optimum packing of code space. The CDMA transmission spectrum can be partitioned into the code-time domains, code-frequency domains, or, in a three-dimensional approach, into the code-time-frequency domains so as to optimize use of the available code space.

The system and method provide better spectral use than, for example, a Universal-Time-Slot approach, coupled with the ability to accommodate a wide range of access rates, the provision of low-cost end points for low-speed users, and the need for only a single transmitter-receiver pair per user.

4. BRIEF DESCRIPTION OF THE DRAWINGS

FIG. 10 depicts a further embodiment of the system and method of the invention for use with time-frequency-code slicing.

5. DETAILED DESCRIPTION OF THE INVENTION

Figure 5:
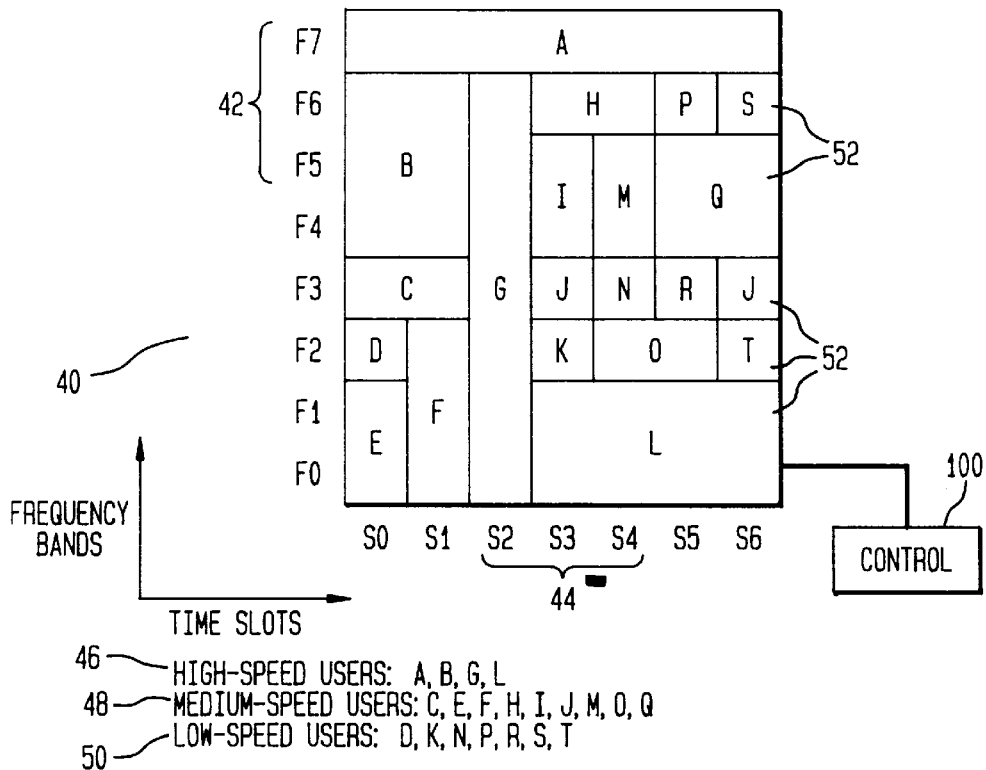
FIG. 5 depicts one embodiment of a time-frequency sliced system in accordance with the system and method of the invention.

Turning now to the drawings, wherein like numerals depict like components, FIG. 5 illustrates a time-frequency slicing approach according to one embodiment of the invention. As illustrated, the overall time-frequency spectrum (or medium) 40 can be partitioned in both the time and frequency domains as a plurality of frequency bands ("slices") 42 (F0, F1, . . . FN) extending over a plurality of individual time slots ("slices") 44 (S0, S1, . . . SN). For purposes of illustration and not of limitation, users of the spectrum can be categorized into three general groups: high speed users 46 (here A, B, G, L); medium speed users 48 (here, C, E, F, H, I, J, M, O, Q); and low speed users 50 (here, D, K, N, P, R, S, T). As illustrated in FIG. 5, a plurality of time-frequency "slices" 52 are gridded into the overall time-frequency spectrum 40.

In accordance with the system and method of the invention, it is assumed that all of the various signals transmitted by users 46, 48, 50 will occupy at least one frequency band 42. Moreover, it will be realized that due to the nature of the equipment typically employed by higher-speed users 46, the high-speed users 46 will have the ability to modulate their signals so as to cover one or more frequency bands 42. Thus, as depicted, the overall medium can be sliced so that low-speed users 50 will be permitted to fill one or more of the available time slots 44 in a frame, while higher-speed users can fill one or more of the available frequency bands 42 or time slots 44.

Figure 1:
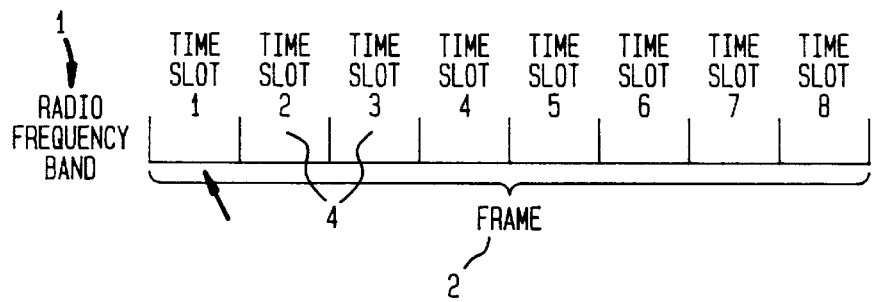
FIG. 1 illustrates a TDMA multi-access architecture for structuring user access for a given band in the frequency spectrum.
Figure 2:
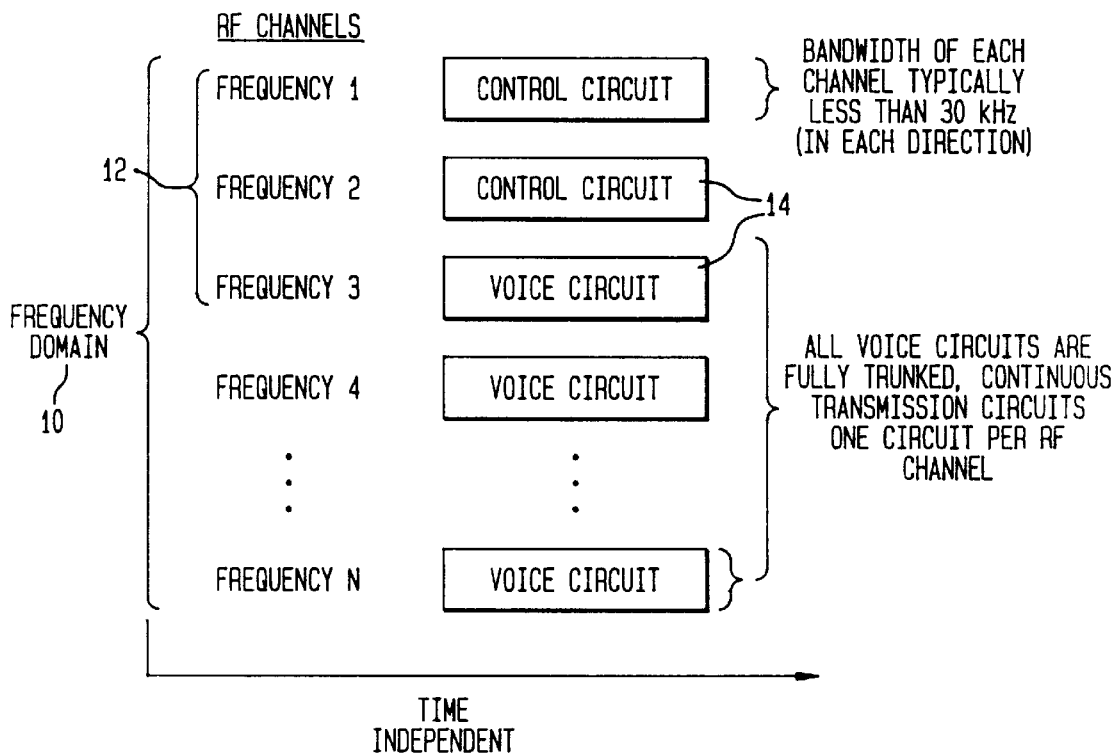
FIG. 2 depicts an FDMA multi-access architecture for structuring user access in the frequency spectrum.
Figure 3:
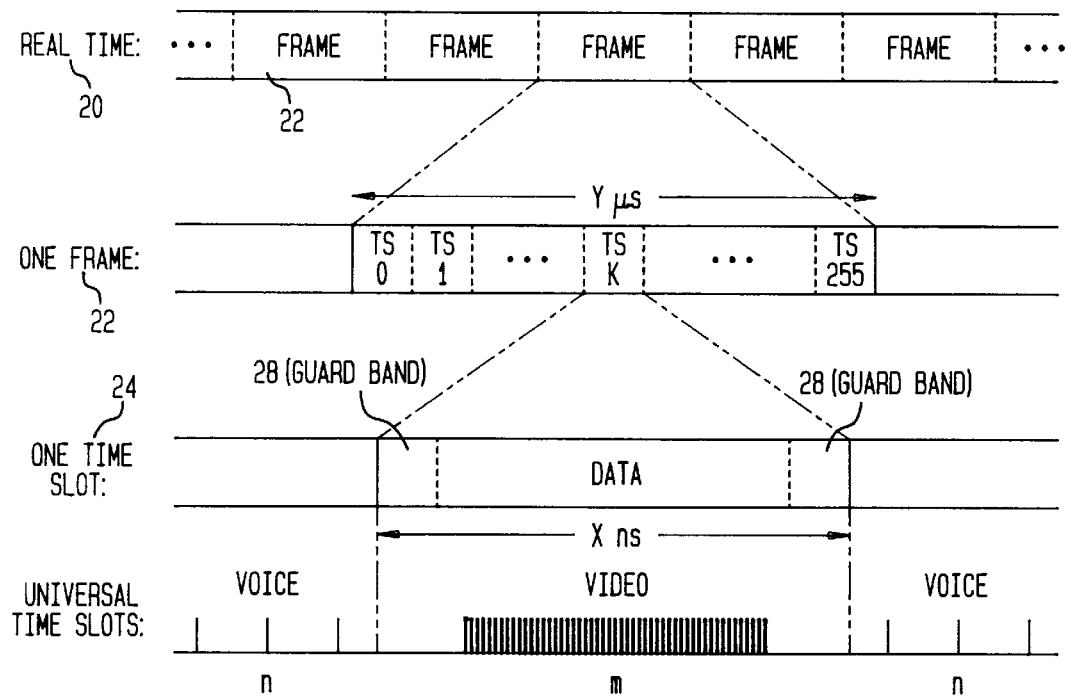
FIG. 3 illustrates a Universal Time Slot approach in communications systems.
Figure 4:
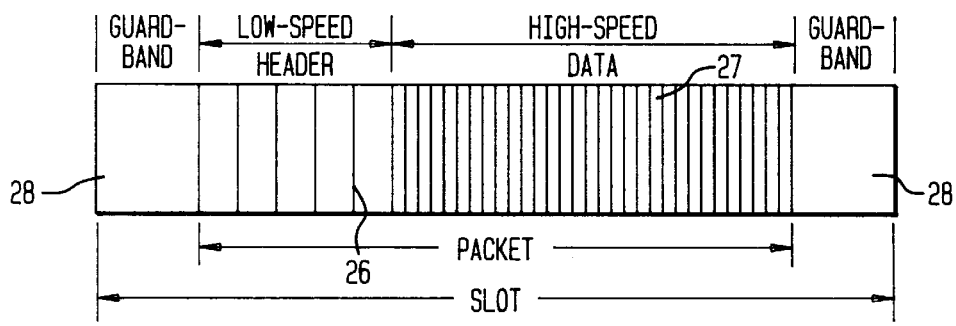
FIG. 4 illustrates a Field Coding approach in optical transmissions by varying header and data fields.

A further assumption is that one "unit" of "slice", which is taken to be one frequency band allocation for one time slot allocation, is the minimum amount of communications resource which will be available to a user. Unlike other transmission techniques (such as the Universal Time Slot approach of FIG. 3) no guard bands "28" are necessary between contiguous frequency bands 42 or time slots 44, or both, that are allocated to a given user, thus optimizing full use of the medium (realizing, of course, that guard bands 28 may be needed to separate different users). Where a single user occupies contiguous allocations, a continuous frequency band 42 and/or a continuous time allocation 44 can be realized because that same user may utilize the space which would be normally occupied by guard bands 28. Examples of the unit slice are depicted in FIG. 5 by the time-frequency slice occupied, for example, by various low speed users 50 (i.e., users D, K, N, etc.).

Thus, through use of their respective transmitters (not shown), the various of the users 46, 48, 50 can modulate their signals into one or more of the available frequency bands 42 on a time slot-by-slot 44 basis in order to effect optimum scheduling of the users within the medium 40 to efficiently make use of the available time-frequency medium 40. The actual positioning (scheduling) of the various speed users 46, 48, 50 within the overall medium may be determined based on such factors as individual user demand, the relative numbers of low speed/medium speed/high speed users, and the like.

One way to effect the slicing of the transmission medium 40 and to implement positioning of the users 46, 48, 50 within the medium is to provide a central control 100 to maintain or otherwise keep a lookup table containing the status of the availability of space within the medium 40 according to frequency band allocations 42 and time slots 44. The central control 100 may then award particular time-frequency slice 52 allocations to the individual users 46, 48, 50 based on such factors as the amount of the medium 40 requested by the users and/or the amount of medium 40 already allocated to users. Individual users may thus align themselves within their assigned time-frequency slices 52 through appropriate signal configuration and/or modulation. Based on the availability of the medium 40, central control 100 can thus allocate particular time-frequency slices 52 to a given user so as to anticipate "future" requests which will be made by users 46, 48, 50 so as to best optimize full use of the overall medium 40. The control 100 can anticipate such requirements, for instance, through use of probabalistic studies, historical or projected load requirements, and the like, as normally maintained by individual service providers. Another way to effect use spectrum of the medium 40 is through random assignments of users 46, 48, 50 to the available time-frequency slices 52. Other ways of effecting slicing and scheduling in accordance with the system and method of the invention can be readily envisioned or otherwise arrived at by those skilled in the art.

As will be appreciated, through scheduling, the time-frequency spectrum 40 can be filled in a more efficient manner than possible with the Universal-Time-Slot approach. Unlike a pure TDMA approach, a common bandwidth is not required, so that the system and method can schedule cost-efficient entry points for lower speed users 50. That is, unlike TDMA, users are capable of operating at their own access rates while still being able to share the overall time-frequency domain 40 with users operating at different access rates. As shown in FIG. 5, several low-speed users 50 can be scheduled to transmit on different frequencies 42 in the same designated time slot 44. For instance, low speed users S, J and T occupy the same time slot S6. During certain other time slots 44, then, a smaller number of high-speed users 46 may be scheduled to transmit.

Moreover, unlike a pure FDMA approach, a given bandwidth 42 can be occupied by multiple users (for instance, users G, B, H, P, S for band F6). Thus, the system and method provide a large degree of flexibility in efficiently packing the time-frequency spectrum 40 and making use of the entire domains.

Oftentimes, it is advantageous that high-speed users 46 be assigned contiguous frequencies 42. Such contiguous assignments eliminate the need for guard bands between the frequencies assigned to a given user. Depending on the modulation scheme, however, certain adjacency requirements may be relaxed. For instance, as will be appreciated, users modulating their signals according to a "multi-tone" scheme may not require contiguous frequency assignments in order to transmit their data. As those skilled in the art will discern, tones represent multi-bit symbols, with each tone toggling at a rate corresponding to the bandwidth of one frequency band. Thus, with multi-tone transmission two bits can be transmitted as one 4-ary symbol using 2-tone modulation instead of two symbols on a binary channel.

Figure 6:
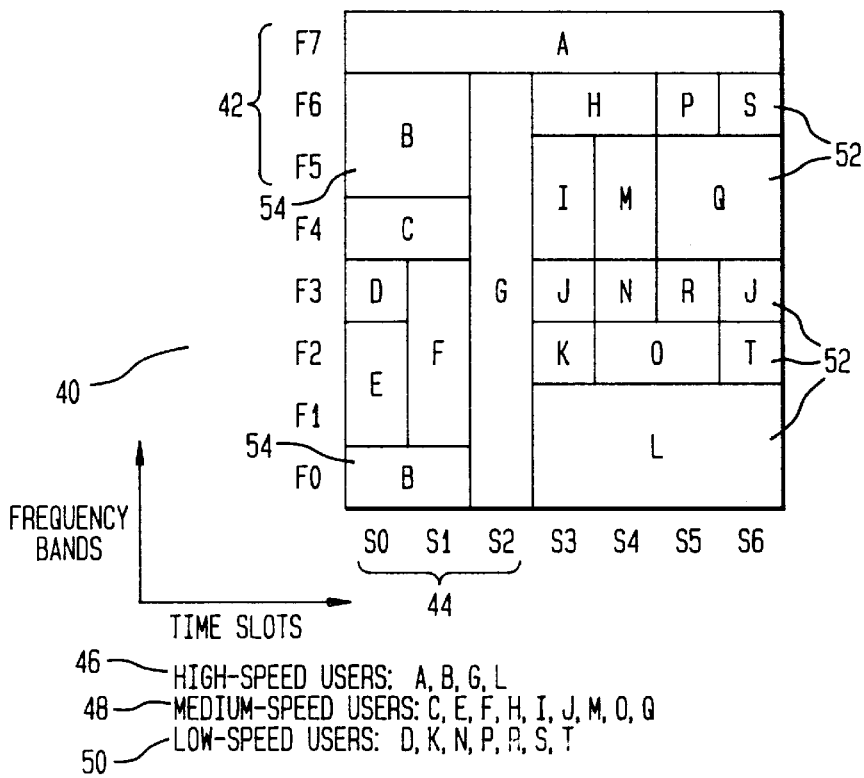
FIG. 6 depicts a second embodiment of a time-frequency sliced system for non-contiguous time-frequency assignments in accordance with the system and method of the invention.

FIG. 6 thus depicts a variation of the time-frequency slicing method of the invention where non-contiguous frequency arrangements may be employed. For instance, higher-speed users 46 operating on multi-tone modulation may benefit from non-contiguous frequency arrangements. Here, a particular high speed user B (designated on FIG. 6 by numeral 54) has been assigned two non-contiguous frequency assignments ("slices") F0 and F5–F6 in the bandwidth, rather than the single contiguous assignment F4–F6 that the same user B might have employed without multi-tone modulation as depicted in FIG. 5. Each of the respective tones modulated by the user (here, B) can occupy a respective frequency assignment without the necessity for contiguous assignments.

An example of a multi-tone approach includes current channelized cellular systems, for instance, cellular telephone systems, cellular data systems, or the like, to provide higher bandwidth to some users. The higher bandwidth is accomplished by allocating multiple channels to each higher-speed user. Since the allocations do not need to be contiguous, more users can perhaps be accommodated than with contiguous assignments (FIG. 5). The blocking probability may be reduced compared to the contiguous assignments of the time-frequency approach as described in FIG. 5.

Thus, it will be realized that higher data rates will be available to higher-speed users 46 by signaling on a combination of tones, whereas the lower-speed user 50 would occupy only a single frequency slice of the bandwidth. The transmission speed of a user can thus determine the number of tones and, thus, the number of frequencies 42 allocated for that user. These tones may be scheduled in possibly non-contiguous frequency slots within one or more time slots, as, for example, for user B in FIG. 6. In fact, it has been found that spreading the frequency allocations of a high-speed user may offer some propagation benefits (e.g., a reduction in the degradation from frequency-selective multipath fading).

It will be understood, of course, that the single transmitter-receiver arrangement as utilized in FIG. 5 will not be employed by high-speed users in multi-tone transmission in order to obtain this scheduling advantage. Here, higher speed users may need to employ multiple transmitters, one for each frequency slice that has been assigned to that particular user. However, it will be understood that as opposed to contiguous transmissions entailing the entire frequency spectrum, for non-contiguous multi-tone transmissions, the base station receiver itself may be simplified, in that only a fixed number ("n") tones in specific frequency bands 42 will need to be received, so that only a single, low bit rate transmitter/receiver pairing may need to be used. It will also be realized that the m-ary components may be modulated by a spectrally efficient scheme or by a constant envelope scheme such as constant power PSK. Higher-level modulations are also possible in the system and method according to the invention.

Other applications of the scheduling method and system according to the invention are also possible. As will be appreciated to those skilled in the art, in addition to the TDMA and FDMA multiple access architectures, a "Code Division Multiple Access" (CDMA) system may also be employed in an effort to permit multiple access to the communications transmission medium. A brief review of the principles of CDMA architecture will serve to better appreciate the applicability of the principles of the system and method according to the invention to that architecture.

In CDMA, individualized transmissions are not strictly separated by frequency (as in FDMA) or strictly separated by time (as in TDMA). Rather, transmissions in CDMA are permitted to controllably interfere with one another by sharing the same frequency spectrum at the same time. By assigning a special, unique code to each of the separate transmissions occupying the CDMA medium, each particular transmitter-receiver pair (which operates according to a respective code) may decode the appropriate transmission occupying the common channel from among the other signals occupying that same channel.

One way to implement CDMA is via "Direct Sequence Spread Spectrum", in which users are assigned codes of small cross-correlation. For example, this code set, large but finite, may be composed of different phases of a long PN-sequence. When users access the channel, they multiply their modulated data stream by their assigned code. The code rate, which is considerably higher than the data bit-rate, is referred to as the chip-rate. At the receiving end, the destination multiplies the received signal by a replica of the source code to recover the original signal.

As those skilled in the art will realize, CDMA support for multiple access stems from the fact that the cross-correlation between two different codes is small. Thus, if a signal encoded at one code ($C_1$) is decoded with a different code ($C_2$), the result appears to the receiver as noise. The limitation of the scheme (i.e., the maximum number of users that can utilize the multiple access channel) depends on the total amount of "noise" contributed by "interfering" users to the detected signal. In other words, the more users simultaneously transmitting on the channel, the greater the level of interference that will exist within the medium. The Signal-to-Interference ratio (S/I) determines the Bit-Error-Rate (BER) performance of the system.

In the spectral domain, the multiplication of the data by the fast bit-rate code corresponds to spreading the data spectral components over a broader spectrum. Thus, a larger spectrum is required to convey the transmission. However, because of the multiple-access feature, a number of users may co-exist at any time on the channel. The ratio of the unspread and the spread signals is called the processing gain, $G_p$, and $G_p = 2R_c/R_b$ where $R_c$ and $R_b$ are the chip and the data bit-rates, respectively. The larger the processing gain, the less "noise" contribution any user has on the other users' signals.

The principles underlying the system and method of the invention will serve to enhance usage of the CDMA medium. The resource space might be sliced into a "time-code" space, a "frequency-code" space or, if viewed in three dimensions, into a "time-frequency-code" space. Thus, it will be appreciated that the scheduling approach according to the system and method of the invention can also be used in the CDMA domain to improve resource usage.

Figure 7:
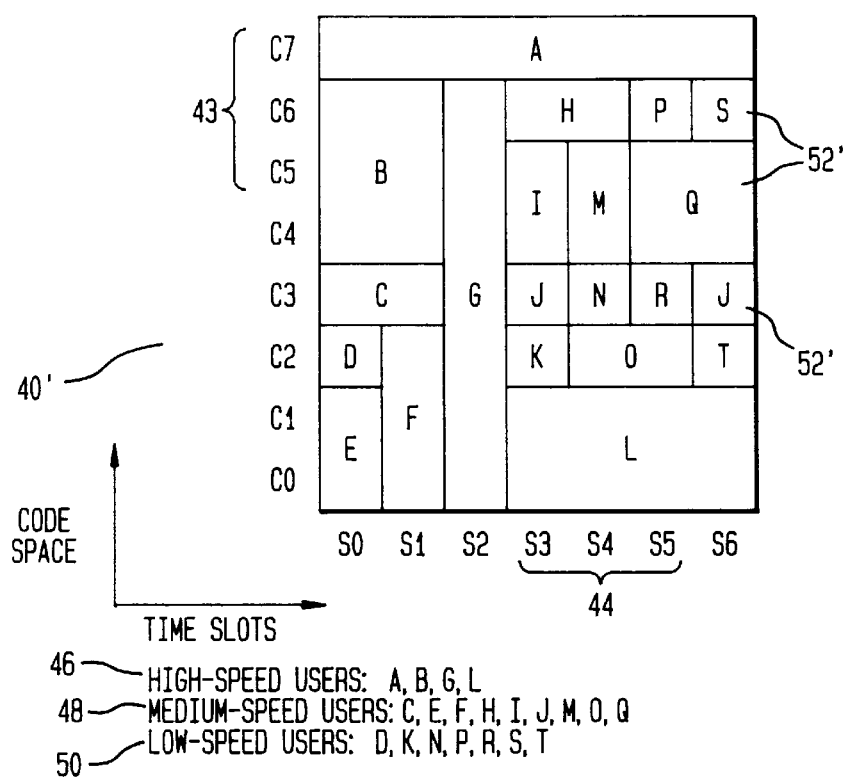
FIG. 7 depicts an embodiment of the system and method of the invention for use with time-code slicing in Code Division Multiple Access (CDMA) systems.
Figure 8:
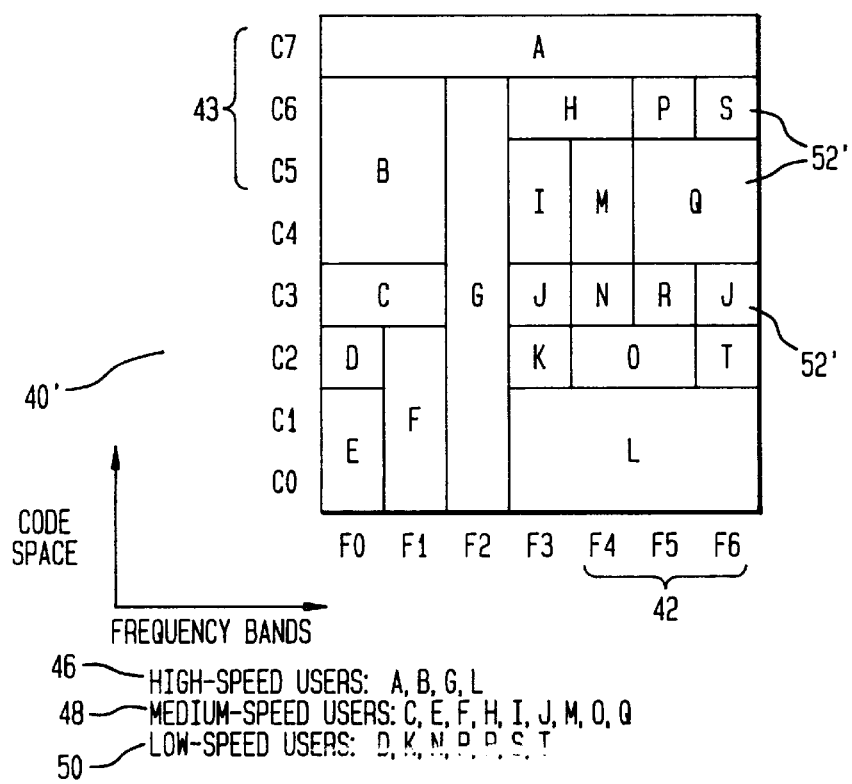
FIG. 8 depicts one embodiment of the system and method of the invention for use with frequency-code slicing in CDMA systems.

FIG. 7 depicts application of a "time-code" slicing method as applied to transmissions in the CDMA domain. FIG. 8 depicts a "frequency-code" slicing approach. As before, a plurality of different speed users 46, 48, 50 are contemplated. The overall medium 40' is partitioned into a plurality of individual, discrete "codes" (43) either over the time (44) domain (FIG. 7) or frequency band 42 domain (FIG. 8), accounting for the relative use of the available code space which is contained within the overall medium 40'.

The term "code space" is used to denote the overall set of all possible codes for assignment to user transmission employing, for instance, a "family" of codes acceptable for purposes of cross-correlation. A user requiring a large degree of code space—for instance, users G, B, M, Q, F—can be granted code space in at least two ways. For purposes of illustration and not of limitation, examples of possible code space allocations are presented in FIGS. 7, 8 and 9. In FIGS. 7 and 8, users B and G, for instance, require a relatively large quantity of code space and as such are granted a plurality of individual codes 43 across time slots (FIG. 7) or frequency bands (FIG. 8). The plurality of individual codes are collectively representative of a larger quantity of code space contained within the overall medium 40'.

Figure 9:
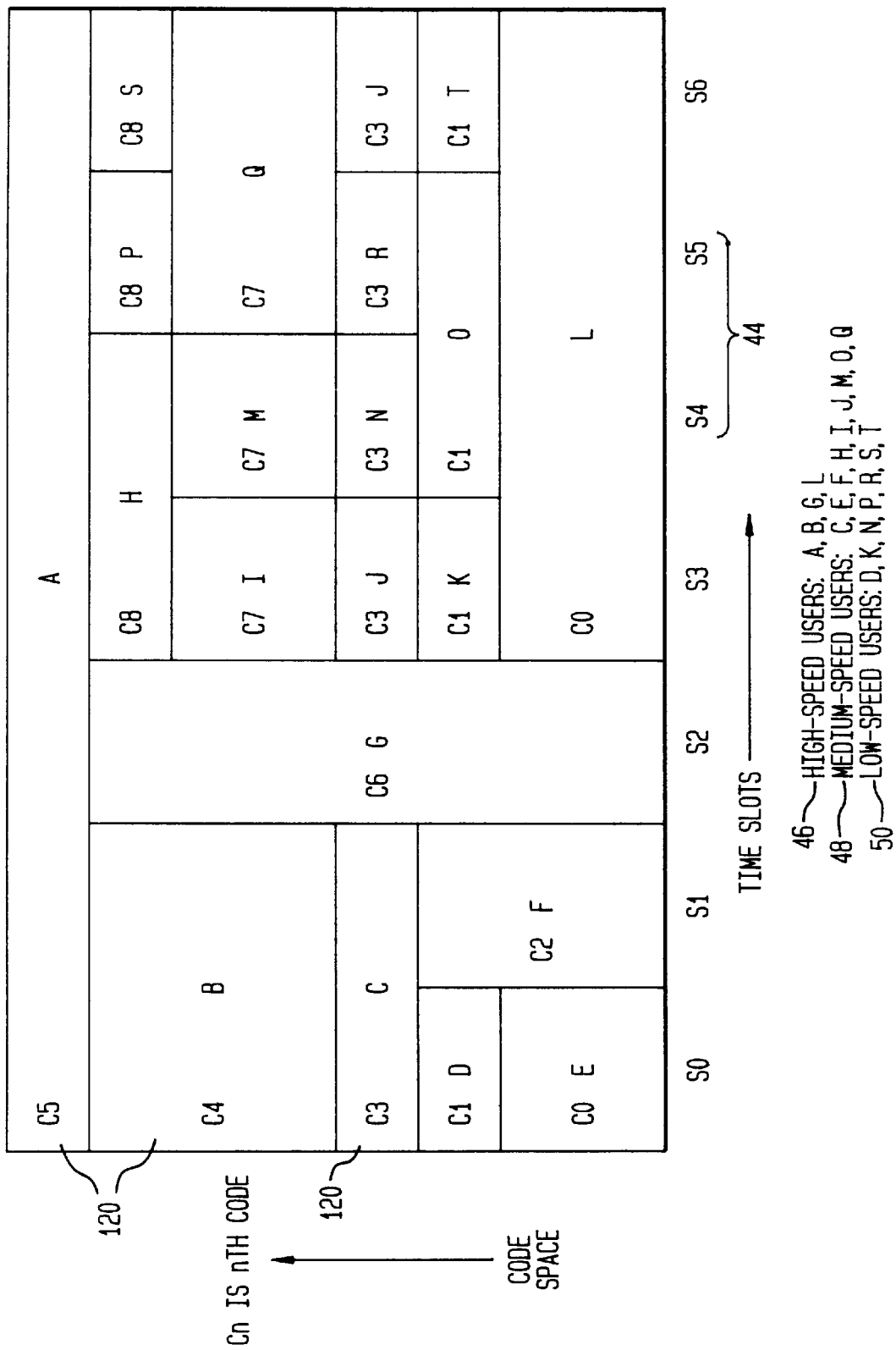
FIG. 9 depicts reuse of code assignments in time-code slicing in accordance with the system and method of invention.

An alternative approach is illustrated in FIG. 9. Here, a user may be allocated codes of differing length 120. The relative length of a given code is inversely related to the quantity of code space to be occupied by a given user. For instance, in FIG. 9, user A is assigned a longer code C5 than user G (code C6). As illustrated in FIG. 9, the relative "height" of the code space occupied by those users is indicative of the quantity of code space occupied by them; here, user A, who has been assigned a longer code (C5) than user G (code C6) occupies less code space than user G. In this manner, optimum use of the overall code space embodied within the medium 40' can be achieved.

It can be seen in FIG. 9 that the system and method provide for efficient reuse of the available codes based on the temporal occupancy requirements of a given user within the medium. For example, it can be seen that code C3 can be reused a number of times—here, by users C, J, N, R—because each of those users do not occupy any common portion of the overall code space located in the medium 40' at the same time.

In general, it can be appreciated that the chip rate does not need to be fixed among users and codes. This means that a signal can be modulated by a code sequence Ci at some chip rate, Ri. Although the chip rate Ri can be arbitrary, in practice, Ri is often chosen as an integer multiple of some minimal chip rate, Rmin. This is because the amount of bandwidth occupied by the spreading depends on the chip rate Ri and Rmin would be selected to fill one frequency slice. This implies a frequency-code slicing or time-frequency-code slicing system and is similar to high-rate users modulating their signal to occupy more than one frequency slice in the time-frequency slicing system. Thus, a user would have to be assigned enough frequency slices to accommodate the spreading associated with the chip rate, Ri. Other users may share the same bandwidth at the same time using different codes.

By spreading a signal over a larger bandwidth (i.e., with a faster chip rate), more independent transmissions can be scheduled in this bandwidth. As previously indicated, scheduling of the independent transmissions depends on the interference level contributed from each transmission, so that the BER of the scheduled transmissions is kept below some predetermined threshold.

It is assumed herein for exemplary purposes only and not for purposes of limitation, that the chip rate of the spreading code is of constant and fixed rate. A single fixed BER threshold is set for all users. Error rates above this threshold is considered unacceptable to all users in the system.

In general, it will be appreciated that users with high bit-rates will tend to transmit at a higher power level and, thus, because of the constant spreading sequence chip rate, higher speed users will contribute more "noise" or "interference" than users with lower bit-rates. Thus, there will be a tradeoff between a large number of low-bit users and a smaller number of high-speed users. The scheduling process accounts for granting the various users codes so that the BER caused by the total level of interference from all the transmissions remains below the acceptable threshold. Hence, to minimize code interference, the various users 46, 48, 50 can be granted use of the available code space for given time periods in the time domain 44. As previously illustrated with regard to FIG. 9, time multiplexing of CDMA will allow for code "reuse" in differing time periods, thereby supporting a large user population with a relatively small number of codes. Scheduling may thus be used to efficiently pack each time slot within overall medium 40, while maintaining acceptable bit error rates.

The scheduling as depicted in FIGS. 7, 8 and 9 accounts for the amount of "code space" a user occupies relative to his transmission rate and also the amount of noise that he will contribute to the other users. As previously described, in "code slicing", the term "code space" is used to denote the overall "set" of all possible codes for assignment to user transmissions, employing, for instance, a "family" of codes acceptable for purposes of cross-correlation. Users 46, 48,

50 may thus be granted differing portions of the code space with, for instance, larger subsets of the code space assigned to higher bit-rate users, for instance, high speed users B, G and L in FIGS. 7 and 8. It can also be seen that, as in a time-frequency sliced approach, the application of the system and method to CDMA will preserve cost-efficient access for all users regardless of their varying access rates. Furthermore, as previously explained in relation to time-frequency slicing, the factors underlying optimum scheduling and governing its determination can be applied to optimize use of the CDMA medium.

On certain non-time slotted CDMA systems, mechanisms will sometimes be required to limit the maximum number of users accessing the system so that a minimum quality can be guaranteed for each user. In accordance with the time-code slicing system of the invention, the scheduling and the time slots provide direct control on the number of users accessing a time slot (i.e., exercising an aspect of congestion control), thereby guaranteeing a particular quality of service for large user populations.

FIG. 10 depicts a similar application of the system and method of the invention to a full, three dimensional "time-frequency-code" sharing scheme. The total space 40" occupied by the transmission medium can be visualized in three dimensions as divided into the time (44), frequency (42) and code (43) domains. Here, optimization of the assignment of available code space so as to minimize "noise" or "interference" is accomplished by frequency multiplexing as well as time multiplexing. Optimum code reuse in both the frequency and time domains is thus achieved.

It will be appreciated that the system and method according to the invention substantially improves usage of the available communications transmission medium and contributes to greater spectral efficiencies than with current approaches. As an example, one may consider a time-frequency slice system in which there are N time slots per (periodic) frame. For simplicity, one may assume that there are only two classes of users: low-speed users that require only one unit time-frequency slice per frame (i.e., a transmission using one frequency band for one time slot), and high-speed users that require X unit slices per frame. We also assume there are a total of F frequency bands.

With a Universal-Time-Slot system, only one user (either low-speed or high-speed) transmits per time slot, and any mix of (at most) N high- and low-speed users can be active. By contrast, in a Time-Frequency-Sliced system according to the invention, one may potentially support up to (FN) low-speed users, or (F/X)N high-speed users, or any mix of high- and low-speed users in which each reduction in the number of high-speed users increases the number of low-speed users by X. Thus, achievable capacity improvement factor is between (F/X) and F. Certain factors such as relative traffic demands and performance requirements of the high- and low-speed users, and selection of the scheduling algorithm, will contribute to the overall efficiency of the system and method of the invention.

Thus, the system and method according to the invention provides optimum access to a communications resource for multiple users at a variety of speeds while maintaining both low-cost access for low-speed users and a good spectral efficiency.

It will be apparent that other and further forms of the invention may be devised without departing from the spirit and scope of the appended claims, it being understood that the invention is not limited to the specific embodiments shown.

We claim:

1. A system for optimizing spectral user of a code-division-multiple-access (CDMA) transmission medium by a plurality of users of varying user-application and access rates, comprising:

a plurality of code slice allocations collectively representing a quantity of code space contained in said transmission medium;

a plurality of time slices in said transmission medium;

means for slicing the transmission medium into a plurality of code-time slices; and means for scheduling one or more users in at least one of said code-time slices in said transmission medium, wherein said means for scheduling schedules a quantity of code space based on a level of interference contributed by each user in said transmission medium, the scheduling based on a number and type of users for each of said code-time slices.

2. The system in accordance with claim 1, wherein a signal transmitted by a user in said transmission medium is assigned a quantity of code space in said transmission medium.

3. The system in accordance with claim 2, wherein said quantity of code space is inversely related to the length of code assigned to a user.

4. A system for optimizing spectral use of a code-division-multiple-access (CDMA) transmission medium by a plurality of users of varying user-application and access speeds, comprising:

a plurality of code slice allocations representing a quantity of code space contained in said transmission medium;

a plurality of time slices in said transmission medium;

means for slicing the transmission medium into a plurality of code-time slices;

a set of individual codes contained within said transmission medium;

means for assigning an individual code having a length to a user of said transmission medium, the length of said individual code inversely related to a quantity of code space to be occupied by said user;

means for scheduling one or more users in at least one of said code-time slices in said transmission medium, wherein said means for scheduling assigns individual length codes to said users based on the code space requirements of the users in said transmission medium.

5. The system of claim 4, wherein at least one of said individual codes in reassigned to a user based on temporal occupancy of said at least one individual code in the transmission medium.

6. A system for optimizing spectral use of a code-division-multiple-access (CDMA) transmission medium by a plurality of users of varying user-application and access speeds, comprising:

a plurality of code slice allocations representing a quantity of code space contained in said transmission medium;

a plurality of time slices in said transmission medium;

a plurality of frequency slices in said transmission medium;

means for slicing the transmission medium into a plurality of code-time-frequency slices; and means for scheduling one or more users in at least one of said code-time-frequency slices in said transmission medium, wherein said means for scheduling schedules a quantity of code space to each of said users of the transmission medium.

7. The system in accordance with claim 6, wherein said means for scheduling schedules users to said code-time-frequency slices based on the user-application and access rates of said users.

8. A method for optimizing spectral use of a CDMA communications transmission medium by a plurality of users of varying user-application and access rates, comprising the steps of:
   slicing the transmission medium into a plurality of code slice allocations collectively representing a quantity of code space contained within said transmission medium;
   slicing the transmission medium into a plurality of time-slice allocations;
   slicing the transmission medium into a plurality of code-time slices, each of the code-time slices occupying space at least equal to one code slice allocation extending over one time slice allocation; and
   scheduling one or more said users in at least one of said code-time slices in the transmission medium according to the amount of code space required by each of said users so as to optimize the occupancy of the code space contained within the communications transmission medium.

9. A method for optimizing spectral use of a CDMA communications transmission medium by a plurality of users of varying user-application and access rates, comprising the steps of:
   slicing the transmission medium into a plurality of code slice allocations collectively representing a quantity of code space contained within said transmission medium;
   slicing the transmission medium into a plurality of frequency slice allocations;
   slicing the transmission medium into a plurality of code-frequency slices, each of the code-frequency slices occupying space at least equal to one code slice allocation extending over one frequency slice; and
   scheduling one or more of said users in at least one of said code-frequency slices in the transmission medium according to the amount of code space required by each of said users so as to optimize the occupancy of the code space contained within the communications transmission medium.

10. A method for optimizing spectral use of a CDMA communications transmission medium by a plurality of users of varying user-application and access rates, comprising the steps of:
    slicing the transmission medium into a plurality of code slice allocations collectively representing a quantity of code space contained within said transmission medium;
    slicing the transmission medium into a plurality of time slices;
    slicing the transmission medium into a plurality of code-time slices, each of the code-time slices occupying space at least equal to one code slice allocation extending over one time slice allocation;
    assigning an individual user a code from a set of individual codes contained within said transmission medium, the length of said individual code inversely related to a quantity of code space to be occupied in the medium by said user; and
    scheduling one or more of said users in at least one of said code-time slices in the transmission medium, wherein the means for scheduling assigns an individual length code to a user based on code space requirements of a user so as to optimize the occupancy of the code space contained within the communications transmission medium.

11. A method for optimizing spectral use of a code-division-multiple-access (CDMA) transmission medium by a plurality of users of varying user-application and access speeds, comprising the steps of:
    slicing the transmission medium into a plurality of code slice allocations representing a quantity of code space contained in said transmission medium;
    slicing the transmission medium into a plurality of time slices in said transmission medium;
    slicing the transmission medium into a plurality of frequency slices in said transmission medium;
    slicing the transmission medium into a plurality of code-time-frequency slices; and
    scheduling one or more users in at least one of said code-time-frequency slices in said transmission medium according to the amount of code space required by each of said users so as to optimize the occupancy of the code space contained within the communications transmission medium.

12. A system for maximizing spectral use of a communications transmission medium by a plurality of users of varying user-application and access rates, comprising:
    a plurality of frequency slices along a frequency dimension in said communications transmission medium;
    a plurality of time slices along a time dimension in said communications transmission medium;
    means for slicing the communications transmission medium into a plurality of time-frequency slices, each of said time-frequency slices occupying a space in said communications transmission medium at least equal to one frequency slice allocation measured over one time slice allocation; and
    means for scheduling said users in a plurality of time-frequency slice so as to maximize the use of said communications transmission medium along both said time and frequency dimensions, wherein at least one of said users modulates a respective transmitted signal over two or more frequency slice allocations in said communications transmission medium, wherein said at least one of said users occupies two or more time-frequency slices extending over two or more frequency slice allocations in said communications transmission medium, wherein said two or more time-frequency slices do not form a continuous allocation.

13. A system for maximizing spectral use of a communications transmission medium by a plurality of users of varying user-application and access rates, comprising:
    a plurality of frequency slices in said communications transmission medium;
    a plurality of time slices in said communications transmission medium;
    means for slicing the communications transmission medium into a plurality of time-frequency slices occupying a space in said communications transmission medium equal to at least one frequency slice allocation measured over one time slice allocation, wherein at least one of said users modulates his respective signal to cover two or more frequency slice allocations in said communications transmission medium; and
    means for scheduling a plurality of users in a plurality of said time-frequency slices so as to maximize the use of said communication transmission medium, wherein said at least one user modulates his respective signal on a multi-tone scheme, wherein each of the tones modulated by said user is allocated to a separate frequency slice, wherein said frequency slice allocation are not contiguous.

14. A method for maximizing spectral use of a communications transmission medium by a plurality of users of varying user-application and access rates, comprising the steps of:

dividing the transmission medium into a plurality of frequency slices;

dividing the transmission medium into a plurality of time slices;

slicing the transmission medium into a plurality of time-frequency slices;

occupying space at least equal to one frequency slice extending over one time slice;

modulating the signal emitted by a user over two or more frequency slices; and scheduling a plurality of users in a plurality of said time-frequency slices so as to maximize the use of the space contained within said communications transmission medium which includes the substep of scheduling two or more time frequency slices having non-contiguous frequency slice allocations.

\* \* \* \* \*

UNITED STATES PATENT AND TRADEMARK OFFICE
CERTIFICATE OF CORRECTION

| | | |
|---|---|---|
| PATENT NO. | : 6,064,662 | Page 1 of 1 |
| APPLICATION NO. | : 09/154403 | |
| DATED | : May 16, 2000 | |
| INVENTOR(S) | : Richard D. Gitlin et al. | |

It is certified that error appears in the above-identified patent and that said Letters Patent is hereby corrected as shown below:

On the Title Page, at Item (63), Related U.S. Application Data, should read as follows:

Continuation of application No. 08/234,197, Apr. 28, 1994.

Col. 1, line 5, should read as follows:

Apr. 28, 1994.

Signed and Sealed this
Twenty-sixth Day of July, 2011

David J. Kappos
*Director of the United States Patent and Trademark Office*